United States Patent [19]
Soleimani et al.

[11] Patent Number: 5,995,812
[45] Date of Patent: *Nov. 30, 1999

[54] VSAT FREQUENCY SOURCE USING DIRECT DIGITAL SYNTHESIZER

[75] Inventors: Mohammad Soleimani, Rockville; John E. Corrigan, III, Chevy Chase, both of Md.

[73] Assignee: Hughes Electronics Corporation, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/523,105

[22] Filed: Sep. 1, 1995

[51] Int. Cl.$^6$ .................................................. H04B 7/155
[52] U.S. Cl. .......................... 455/119; 455/76; 455/12.1
[58] Field of Search .................... 455/12.1, 14, 75, 455/76, 144, 116, 159, 120

[56] References Cited

U.S. PATENT DOCUMENTS

| | | | |
|---|---|---|---|
| 3,993,868 | 11/1976 | Balcewicz | 178/66 |
| 4,581,643 | 4/1986 | Carlson | 358/191.1 |
| 4,605,968 | 8/1986 | Hayashi | 358/188 |
| 4,755,773 | 7/1988 | Ohmagari | 332/9 |
| 5,062,122 | 10/1991 | Pham et al. | 375/1 |
| 5,230,010 | 7/1993 | Betts et al. | 375/39 |
| 5,301,367 | 4/1994 | Heinonen | 455/76 |
| 5,376,941 | 12/1994 | Fukazawa et al. | 342/359 |
| 5,408,687 | 4/1995 | Ooga | 455/76 |
| 5,410,747 | 4/1995 | Ohmagari et al. | 455/119 |
| 5,488,379 | 1/1996 | Jackson et al. | 342/359 |
| 5,559,809 | 9/1996 | Jeon et al. | 370/120 |
| 5,561,433 | 10/1996 | Chaney et al. | 342/359 |
| 5,576,666 | 11/1996 | Rauvola | 331/25 |
| 5,577,074 | 11/1996 | Roos et al. | 455/75 |
| 5,578,972 | 11/1996 | Hadden et al. | 333/135 |
| 5,594,735 | 1/1997 | Jokura | 455/76 |
| 5,671,220 | 9/1997 | Tonomura | 370/281 |
| 5,678,210 | 10/1997 | Hannah | 455/128 |
| 5,774,788 | 6/1998 | Hannah et al. | 458/12.1 |
| 5,790,601 | 8/1998 | Corrigan, III et al. | 375/302 |

OTHER PUBLICATIONS

*Direct Generation of MSK Modulation At Microwave Frequencies*, S. Kumar, W.J. Chudobi and J. S. Wight, Department of Electronics, Carleton University, Ottawa, Ontario, Canada, 1981.

A 100 Mbit/s Prototype MSK Modem For Satellite Communications, Yoshiteru Morihiro et al., 1979.

Digital Modulation Using The NCMO™, Numerically controlled Modulated Oscillator (NCMO) Creates Digitally Defined RF Waveforms, Robert J. Zavrel, Jr., Digital RF Solutions Corporation.

*Primary Examiner*—Edward F. Urban
*Attorney, Agent, or Firm*—John T. Whelan; Michael W. Sales

[57] ABSTRACT

A frequency generation device for a satellite communication system composed of a central hub station and a number of remote units. The remote units contain a single synthesizer located in an indoor unit. In this invention, the indoor-located synthesizer is a direct digital synthesizer which modulates the baseband signal and conveys the modulated signal to an outdoor unit for communication between the remote unit and the central hub. In the outdoor unit, the signal is converted directly by a fixed number to a Ku band frequency and transmitted to the central hub.

14 Claims, 4 Drawing Sheets

VSAT FREQUENCY SOURCE USING DIRECT DIGITAL SYNTHESIZER

BACKGROUND OF THE INVENTION

Satellite communication systems typically have employed large aperture antennas and high power transmitters for establishing an uplink to the satellite. Recently, however, very small aperture antenna ground terminals ("VSAT"), referred to as remote ground terminals, have been developed for data transmission at low rates. In such systems, the remote ground terminals are utilized for communicating via a satellite from a remote location to a central hub station. The central hub station communicates with multiple remote ground terminals, and has a significantly larger antenna, as well as a significantly larger power output capability than any of the remote ground terminals.

The remote ground terminals are comprised of an indoor unit (IDU) and an outdoor unit (ODU). The indoor unit receives data from the user's equipment and transfers this data to the outdoor unit. The IDU and ODU are usually placed at the same location, but are physically separated and connected by a communication cable. The transmitter of the ODU functions to produce a carrier signal in accordance with an intermediate frequency signal received from the IDU and then transmits this signal to the satellite. Upon receipt by the central hub station, the modulated carrier signal is demodulated such that the data transmitted from the remote user is reproduced and processed by the central hub station.

In a low-rate VSAT system, it is very important that good transmit frequency accuracy be maintained. In a remote VSAT terminal, the reference frequency is sometimes corrected for long-term drift using the signal received from the VSAT hub (the "outroute") as a reference. The local frequency reference can be compared with the outroute symbol rate to determine what frequency adjustment is necessary at the remote terminal.

In order to generate the proper frequency at the remote, previous VSATs employed a combination of frequency synthesizers linked to a common stable reference frequency. The reference frequency is usually fixed to a standard frequency (such as 10 MHz). This reference circuit is stabilized using a combination of temperature control (a small temperature controlled housing surrounding the oscillator), temperature compensation, and comparison of outroute signals received from the central hub to those at the remote terminal.

Although most satellite communications activity takes place in the C band, there is a steady move toward the higher frequencies. Most new communications satellites operate in the Ku band having uplink frequencies in the 14–14.5 GHz range and downlink frequencies in the 11.7 to 12.2 GHz range.

In a remote Ku band VSAT terminal, the transmitter frequency must typically be generated to a carrier channel assignment with a resolution of about 10 KHz over a 500 MHz range. In addition, phase noise must be controlled to enable modulation at symbol rates as low as 32 KHz. Traditionally, when using synthesizers other than DDS synthesizers, these requirements have dictated the use of two synthesizers—a "fine step" synthesizer to perform channel assignment and a "coarse step" synthesizer to perform modulation. The two synthesizers may be co-located in the IDU or ODU equipment of the remote terminal. It is desirable to locate these circuits indoors because of the reduced temperature ranges to which the IDU is exposed, however, with traditional techniques locating both synthesizers in the IDU dictates the use of a wide-band Intra Facility Link ("IFL") cable because of the need to send a 500 MHz bandwidth between the IDU and ODU.

In another type of prior art synthesizer, the IDU contains the fine synthesizer for narrow range modulation and the ODU contains the coarse synthesizer. The disadvantages of this prior art construction are the temperature ranges to which the synthesizer in the ODU is subjected require that the ODU have expensive packaging and temperature compensation equipment to protect the synthesizer in the ODU.

The prior art frequency generator devices using two synthesizers do not provide the important advantage of fine resolution using a single synthesizer in the IDU in conjunction with the use of relatively inexpensive narrow bandwidth cable equipment between the IDU and the ODU.

SUMMARY OF THE INVENTION

The objective of this invention is to simplify the overall operation and design of the carrier frequency generation components of the VSAT using a direct digital synthesizer (DDS) as a key element. This invention is a part of a new type of Ku band VSAT terminal and system which uses minimum-shift-key (MSK) modulation for the remote-to-hub ("inroute") instead of the traditional phase-shift-key (PSK) modulation. MSK is a "constant envelope", "continuous phase" modulation.

The frequency generation device of this invention reduces the two synthesizers of the prior art to a single synthesizer located in the IDU. In this invention, the indoor-located synthesizer generates a reference signal which is conveyed to the outdoor unit. In the outdoor equipment, this signal frequency is converted indirectly ("multiplied") by a fixed number (e.g. 128) using a phase-locked-loop to produce a signal of the desired frequency.

The DDS of this invention operates such that the IDU generated signal has sufficient resolution (e.g., 78 Hz) and sufficiently low phase noise (e.g., 0.039° rms) in order to make this design practical. The DDS also provides a scaled modulation which moves the carrier up and down in frequency at a controlled rate using fine steps of less than 1 Hz. The DDS creates a high resolution, low frequency with spurious outputs not exceeding −70 dBc.

The further objects of this invention include the ability to achieve fine resolution using only a single synthesizer, to achieve an output having the necessary spurious levels for satellite communication, and to use a relatively simple cable for transmission between the IDU and ODU.

The invention itself, together with further objects and attendant advantages, will best be understood by reference to the following detailed description taken in conjunction with the accompanying drawings.

DETAILED DESCRIPTION OF THE INVENTION

Figure 1:
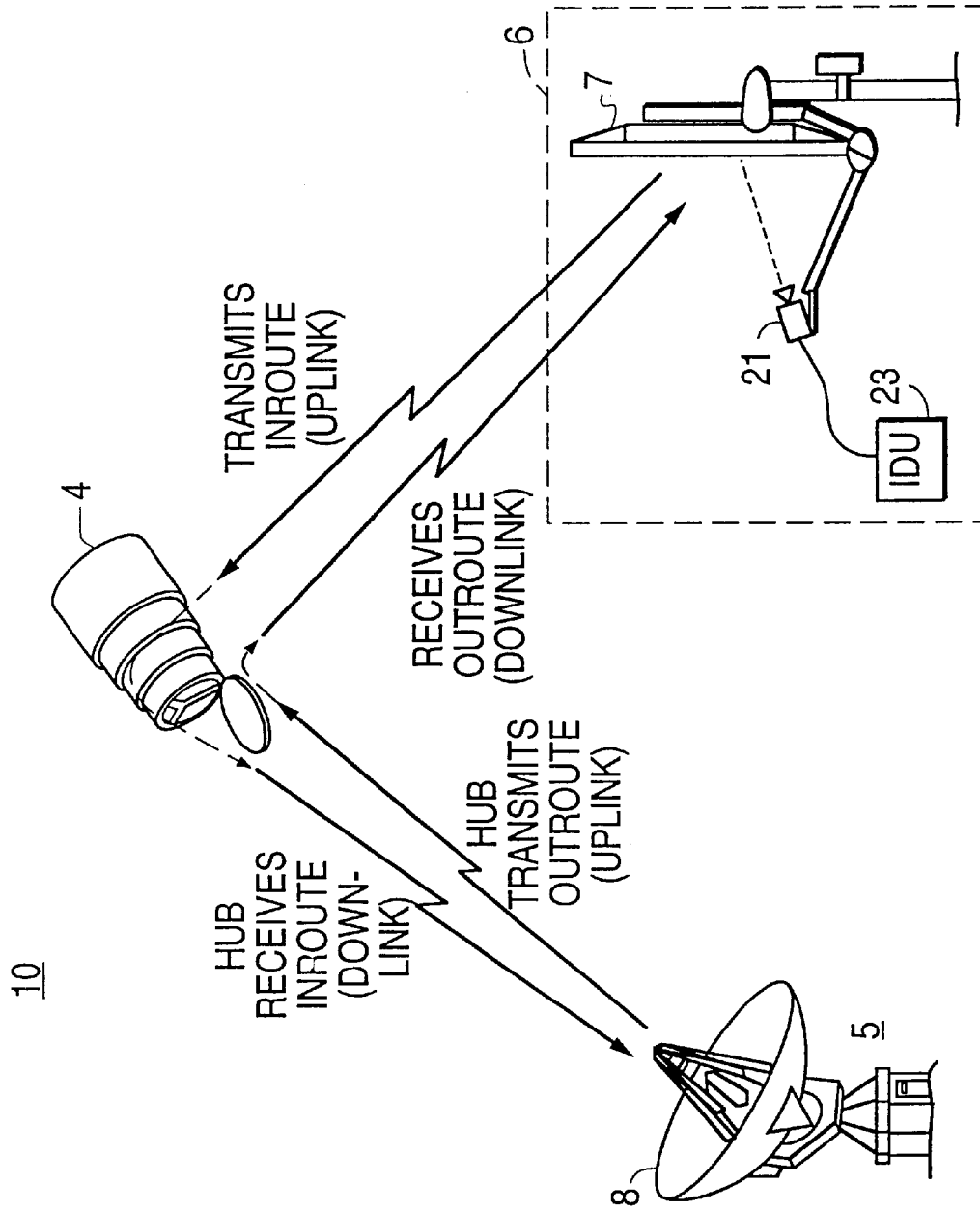
FIG. 1 is a block diagram of a VSAT satellite communication network which utilizes the invention.

Turning now to the drawings, the VSAT satellite communication network 10 illustrated in FIG. 1, comprises a central hub station 5, a communication satellite 4, and a plurality of remote ground terminals 6 (only one is shown). The VSAT network 10 functions as a two-way transmission system for transferring data and voice communications between the central hub station 5 and the numerous remote ground terminals 6. All data is transferred between the central hub station 5 and the remote ground terminals 6 via transponders located in the satellite 4. Signals transmitted from the central hub station 5 to the remote ground terminal 6 are referred to as "outroute" while signals transmitted in the opposite direction are referred to as "inroute".

As stated, the central hub station 5 supports a plurality of remote ground terminals 6. The central hub station 5 comprises a large antenna 8 to allow for the transmission of a signal sufficiently strong such that the signal can be received by the remote ground terminals 6 which have relatively small antennas. The large antenna 8 of the central hub station 5 also compensates for the relatively weak signals transmitted by the remote ground terminals 6.

The remote ground terminal 6 comprises a small aperture antenna 7 for receiving and transmitting the inroute and outroute signals; an outdoor unit 21 typically mounted proximate the antenna 7 which comprises a transmitter for producing and transmitting a modulated inroute signal; and an indoor unit 23 which operates as an interface between the user's communication equipment (e.g., data terminals, personal computers, monitoring equipment and telephone equipment) and the outdoor unit 21.

More specifically, the indoor unit 23 is coupled to the user's equipment (not shown in FIG. 1). The indoor unit 23 is also coupled to the outdoor unit 21. The indoor unit 23 receives and transfers data from the user's equipment to the outdoor unit 21. The transmitter of the outdoor unit 21 functions to produce and modulate a carrier signal in accordance with the data received from the indoor unit 23 and then transmits this signal (i.e. uplink) via a wireless communication link to the satellite 4. The satellite 4 is also linked to the central hub 5 via a wireless communication link so that the signal from the indoor unit 23 is transferred to the central hub station 5. Upon receipt by the central hub station 5, the modulated carrier signal is demodulated such that the data transmitted from the remote user is reproduced and processed by the central hub station 5.

In order to maintain a good transmit frequency accuracy in the remote ground terminal 6, the remote terminals of this invention obtain their reference frequency from the bit timing of the outroute from the central hub 5. Each remote terminal 6 contains a frequency generator as shown in FIG. 2 in accordance with this invention.

Figure 2:
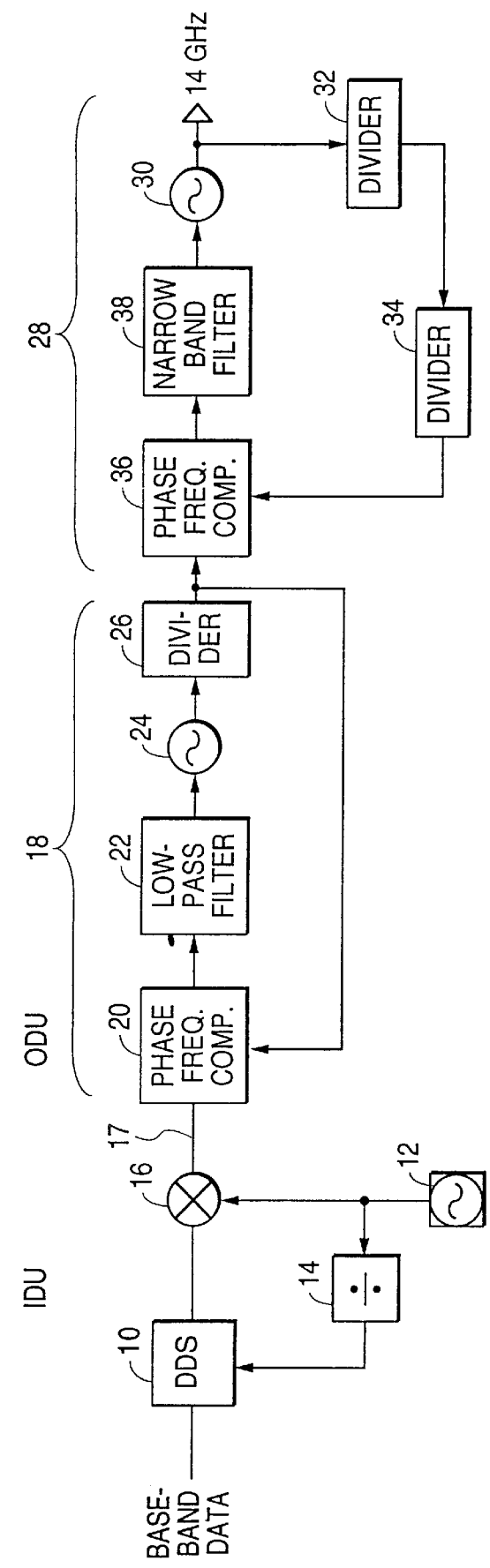
FIG. 2 is a simplified block diagram of the VSAT frequency generator of this invention.

FIG. 2 illustrates a frequency source generator using a DDS in accordance with a preferred embodiment of this invention. In practice, the frequency generator of this invention can be implemented using commercially available RF circuits well known to those skilled in the art.

The frequency source generator of this invention comprises the IDU 23 connected to the ODU 21 via a cable 17. The IDU contains a DDS 10, a reference oscillator 12, a divider 14, and a mixer 16. A personal computer or other communication device (not shown) generates baseband data that is input to the DDS 10 for transmission. The reference oscillator 12 generates a reference frequency signal which is input to both the divider 14 and the mixer 16. The output of the divider 14 is input to the DDS 10. The output of the DDS 10 and the output of the reference oscillator 12 are combined in the mixer 16 to produce an intermediate frequency which is input to a narrow band tracking filter 18 of the ODU via the narrow bandwidth cable 17.

The narrow band tracking filter 18 includes a phase/frequency comparator 20, a low-pass filter 22, a VCO 24, and a divider 26. The output from the mixer 16 of the IDU 23 is input to the phase/frequency comparator 20 via the narrow bandwidth cable 17. The phase/frequency comparator 20 also has as an input the output of the divider 26, so that the phase/frequency comparator 20 can compare the phase of the modulated signal from the IDU 23 to the output of the narrow band tracking filter 18 out of the divider 26. The phase/frequency comparator 20 produces a phase offset signal which is input to the low-pass filter 22. The low-pass filter 22 selects signals within a desired frequency range and inputs the selected signals to the VCO 24. The output of the VCO 24 is input to the divider 24 whose output along with being input to the phase/frequency comparator 20 is also input to a phase/frequency comparator 36 of a PLL frequency synthesizer 28.

The PLL frequency synthesizer 28 comprises the phase/frequency comparator 36, a narrow band filter 38, a VCO 30, and dividers 32 and 34. The phase/frequency comparator 36 has as its inputs the output signal from the divider 26 and the output of the divider 34. The output of phase/frequency comparator 36 is input to narrow band filter 38 which filters out all but the desired frequencies. The filtered signal from narrow band filter 38 is input to VCO 30.

The VCO 30 produces the upconverted signal from the ODU 21 that is to be transmitted. The VCO 30 output is also input to the divider 32. The divided frequency signal output from the divider 32 is input to the divider 34, whose output is the second input to the phase/frequency comparator 36 as stated above.

Still referring to FIG. 2, the signal from the IDU 23 of the frequency generator of this invention is a modulated signal of approximately 100 MHz, and the signal output from the ODU 21 is a Ku band signal of 14–14.5 GHz. Thus, the ODU 21 must up-convert the IDU 23 signal to the Ku band.

The central hub 5 expects that each remote terminal 6 will send data at the same frequency. Thus, the reference oscillator 12 generates a reference frequency signal matching that of the central hub 5. The reference oscillator 12 generates a reference frequency signal which is input to and divided in the divider 14. The output of the divider 14 is input to the DDS 10. In the preferred embodiment, the reference oscillator 12 produces a reference frequency signal of approximately 100 MHz and the divider 14 is a divide by 4 divider, thus a 25 MHz signal is input to the DDS 10. The DDS 10 also receives the baseband data signal as an input from the communication device. The DDS 10 is controlled to output its signal at the input of a clock signal (not shown), and in the preferred embodiment the DDS is limited to a 25 MHz frequency.

The DDS 10 is ideally suited for the invention because of its ability to rapidly change frequencies, achieve fine steps, maintain excellent phase noise, provide transient free frequency changes, and function as a modulator. The basic components and operation of the DDS 10 are well known to those skilled in the art, and can be found in "Digital-Direct Frequency Synthesis . . . a tutorial", by Sciteq Inc. (1992) for example. The DDS 10 of this invention is a commercially available single monolithic integrated circuit well known to those skilled in the art.

The reason for using the DDS 10 in the invention is because of its ability to produce a high resolution, low output frequency. For example, to achieve a 10 KHz step size at Ku-band, the DDS 10 in the preferred embodiment must achieve a resolution of 78 Hz (10 kHz÷128=78 Hz). However, the key to the invention is balancing the low phase noise, fine step size, and spurious levels to produce a Ku band signal. The fine resolution of the DDS 10 indirectly creates more phase noise, and one must be mindful of controlling the spurious levels so that they will not interfere with other communication channels.

In operation, baseband data from the communication device is input to the DDS 10. The DDS 10 establishes the carrier center frequency in the channel assigned for transmission of the data, and also performs modulation of the data. The DDS 10 is capable of producing frequency modulation on the carrier in response to the baseband data signal shown in FIG. 2. The DDS 10 performs modulation by moving its output frequency in small increments in accordance with the prescribed modulation method and signal shaping requirements of the system. If the DDS's resolution is fine enough, it can produce various types of modulation including frequency-shift-key (FSK), and minimum-shift-key (MSK) including Gaussian-minimum-shift-key (GMSK). For example, if the peak deviation requirement is 32 kHz and the ODU 21 multiplies the IF frequency by 128, the peak deviation at the DDS output is 250 Hz (32 kHz÷128=250 Hz). Since the DDS resolution is on the order of 1 Hz, good modulation accuracy can be obtained. These modulation methods are the subject of copending application U.S. Ser. No. 08/523,308, "Fractional Modulation In a VSAT."

The output of the DDS 10 and the reference oscillator 12 output are combined in the mixer 16 to produce an intermediate frequency signal of 111±2 MHz. This frequency is selected by working backwards from the desired Ku band transmission frequency of 14 GHz and the value of the dividers in the ODU. To achieve a 14 GHz signal out of the ODU, the signal from the IDU must be 111 MHz based on the values of dividers 32 and 34, which in the preferred embodiment total 128 (i.e., 14 GHz÷128≈111 MHz).

The effect of the mixer 16 is to up-convert the DDS 10 frequency to a specified intermediate frequency range by mixing it with the reference oscillator 12 frequency signal. This direct up conversion strategy is chosen to control the amount of spurious and phase noise which are present at the IDU 23 output. In order to make this design practical, the phase noise out of the ODU 21 must be at or below 5° rms. Since the ODU 21 will produce phase noise equal to the IDU's phase noise increased by the multiplication factor (in this case 128) the IDU's phase noise output must be held to below 0.039° rms. (i.e., 5°÷128=0.039° rms.). A typical low noise VCXO of the type used in 12 can meet this requirement.

A further consideration in the selection of direct upconversion of the DDS output (items 12, 16 and 10 in FIG. 2) is the level of spurious outputs which will ultimately be present in the VSAT output at the ODU 21. Typical satellite operations require the VSAT to control its spurious outputs to 45 dB below the carrier (below −45 dBc). Because of the indirect upconversion method used in the ODU 21 (PLL frequency synthesizer 28 in FIG. 2), any spurious signals received from the IDU 23 are increased relative to the carrier by a factor equal to the multiplier ratio (in this case 128). Thus, to achieve the required −45 dBc carrier, the IDU spurious must fall below −66 dBc (−45 dBc−20 log (128)=−66 dBc). Both the DDS 10 (as noted earlier) and the reference oscillator 12 meet this requirement. Furthermore, it can be seen from the above calculations that an attempt to use a multiplier ratio in the ODU 21 significantly greater than 128 would be impractical due to the severe spurious level requirement it would impose upon the IDU 23 and the DDS 10.

Using the narrow bandwidth cable 17, the intermediate frequency signal from the mixer 16 is sent from the IDU 23 to the ODU 21. Because the frequency signal from the IDU 23 is about 111 MHz, there is no need to use the wide-band IFL cable that was necessary to transmit the large frequency signals (e.g. 500 MHz) from the IDU in the prior art VSAT frequency generation systems.

The signal from the IDU 23 is input to a narrow band tracking filter 18. The narrow band tracking filter 18 filters out the effect of noise and other factors that affect the signal when it is transmitted from the IDU 23 to the ODU 21. Therefore, in the narrow band tracking filter 18 the frequency in equals the frequency out minus the adverse transmission effects.

The narrow band tracking filter 18 includes the phase/frequency comparator 20 which has as its input the modulated signal from the IDU 23 and compares the phase of the modulated signal from the IDU 23 to the output of the narrow band tracking filter 18. The phase/frequency comparator 20 outputs a phase offset signal representing the phase difference between the output of the IDU 23 and the output of the narrow band tracking filter 18. The phase offset signal is input to the low-pass filter 22 which filters out all but the desired frequency range. The filtered frequency signal from low-pass filter 22 is input to the VCO 24, and the output of VCO 24 is input to the divider 26. The VCO 24 and the divider 26 work in conjunction so that the resulting frequency signal output from the narrow band tracking filter 18 has the same frequency as the output from the IDU 23. In the preferred embodiment, the frequency signal generated by the VCO 24 is about 888 MHz and the divider 26 has a frequency division ratio of 8, so that the output signal is about 111 MHz.

The frequency from the narrow band tracking filter 18 enters the PLL frequency synthesizer 28 which acts as a frequency multiplier. As stated above, the PLL frequency synthesizer 28 comprises the phase/frequency comparator 36, the narrow band filter 38, the VCO 30, and dividers 32 and 34.

The phase/frequency comparator 36 has as its inputs the output signal from the divider 26 (i.e. 111 MHz in this embodiment) and the output of the divider 34. The output of phase/frequency comparator 36 is input to narrow band filter 38 which filters out all but the desired frequencies. The filtered signal from narrow band filter 38 is input to VCO 30.

The output from VCO 30 is the modulated data up-converted to the Ku band to be output from the ODU 21. The VCO 30 output is also input into a divider 32. The divided frequency signal output from the divider 32 is input to divider 34. The output of divider 34 serves as the second input to phase/frequency comparator 36. In the phase/frequency comparator 36 the output from the divider 26 and the output from the divider 34 are compared to provide an error signal to the VCO 30 so that the VCO 30 is synchronized to the output from the narrow band tracking filter 18.

In the preferred embodiment, the dividers 32 and 34 are divided by 8 and 16 dividers, respectively. These values were chosen because of the desired Ku band output from the VCO 30 (i.e. 14 GHz÷128=111 MHz) and because of the commercial availability of 8 and 16 dividers in this frequency range. However, a single divider or a plurality of dividers of different values can be used to achieve the desired Ku band output.

Numerous variations on the preferred embodiment are possible to ease the implementation or optimize the design vs. cost tradeoffs. For example, in the preferred embodiment described above, the Ku-band VSAT requires a VCO which operates in the 14–14.5 GHz region. Since these devices are at present difficult to build in low-cost monolithic ICs, different values for the VCO, multipliers, dividers may be used as shown in FIGS. 3 and 4.

Figure 3:
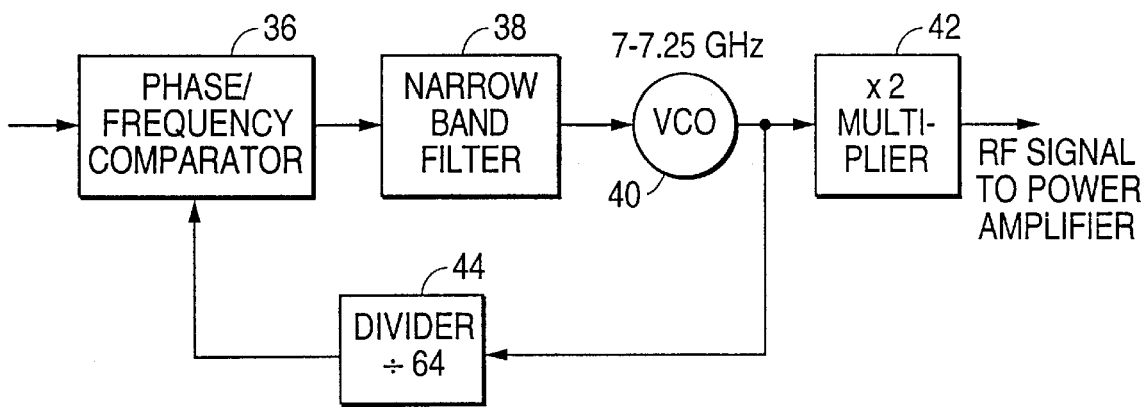
FIG. 3 is a block diagram of an alternative embodiment of the phase locked loop (PLL) frequency synthesizer of this invention.

FIG. 3 shows an alternative embodiment of the PLL frequency synthesizer of the ODU 21. In FIG. 3, elements that are the same as those shown in FIG. 2 are identified by like numerals. In this embodiment, a VCO 40 having a frequency of about 7–7.25 GHz is substitute for the higher frequency VCO 30 shown in FIG. 2. The output of VCO 40 is input to a times 2 multiplier circuit 42 which up-converts the modulated data to the Ku band prior to transmission.

Further, this embodiment includes a single divider 44 having as its input the output of VCO 40. The divider 44 functions in the same fashion as the dividers 32 and 34 of FIG. 2. Thus, the output of the divider 44 serves as the second input to phase/frequency comparator 36. All other elements in FIG. 3 are identical to their counterparts in FIG. 2.

Figure 4:
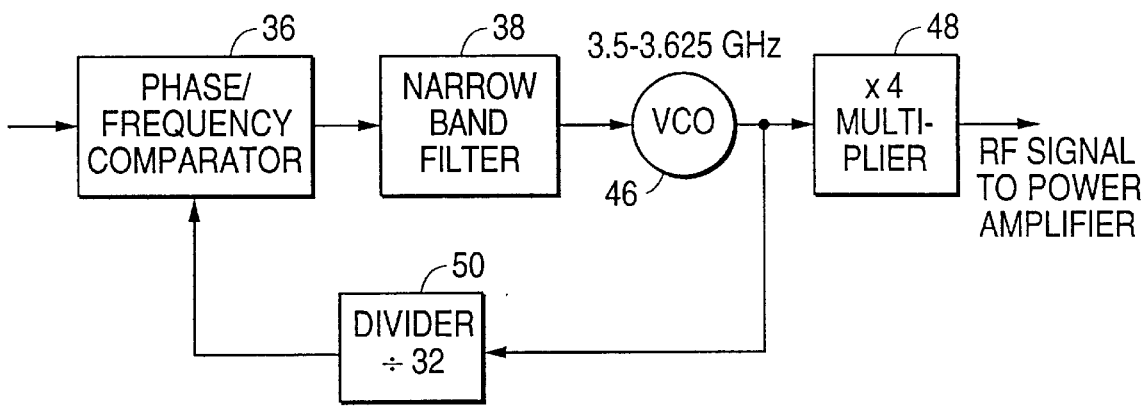
FIG. 4 is a block diagram of the preferred embodiment of the PLL frequency synthesizer of this invention.

Yet another variation to the PLL frequency synthesizer 28 is shown in FIG. 4. In FIG. 4, a frequency VCO 46 having a frequency of about 3.5 GHz is coupled to a times 4 multiplier circuit 48 and a divide by 32 divider 50 in place of the times 2 multiplier 42 and divide by 64 divider 44 shown in FIG. 3. As in FIG. 3, the performance advantages described earlier are all present and no other part of the VSAT is changed from the preferred embodiment.

Figure 5:
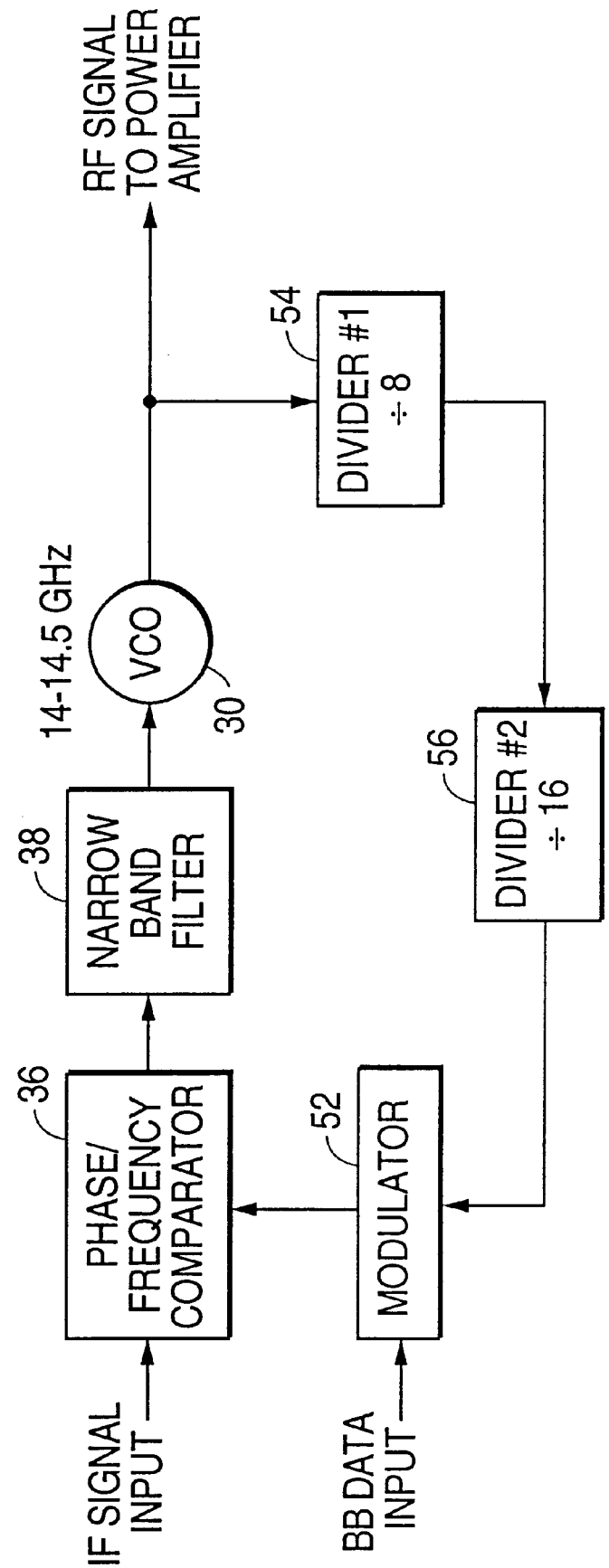
FIG. 5 is a block diagram of another alternative embodiment of the PLL frequency synthesizer of this invention.

In a further alternative embodiment, as shown in FIG. 5, a modulator 52 is added to the PLL frequency synthesizer 28. In this embodiment, the intermediate frequency signal from divider 26 (not shown in FIG. 5) is input to the phase/frequency comparator 36. The output of the phase/frequency comparator 36 is input to the narrow band filter 38, whose output is in turn input to the VCO 30.

The output from VCO 30 is the modulated data up-converted to the Ku band to be output from the ODU 23. The VCO 30 output is input to a divide by 8 divider 54. The output of divider 54 is input to a divide by 16 divider 56. The output of divider 56 is input to the modulator 52. In this embodiment, the baseband signal is also input to the modulator 52 as opposed to the baseband signal being input to the DDS 10 as shown in FIG. 2. Thus, instead of the signal from the IDU 23 to the ODU 21 already being modulated, the signal is modulated in the ODU 21. This modulated signal is input to the phase/frequency comparator 36 where it is compared with the output of divider 26 to provide an error signal to the VCO 30 so that the VCO 30 is synchronized to the output from the narrow band tracking filter 18.

The advantage of this approach is that the IDU's DDS 10 can be simplified, since it would not be required to perform modulation of the carrier signal. Direct modulation of the RF carrier in the ODU can be achieved easily and efficiently using conventional microwave transceiver techniques well known to those skilled in the art.

A disadvantage of this approach, however, is that the modulator's input data must be conveyed to the ODU via some means separate from the IF signal. This alternative achieves most of the advantages of the first described embodiment yet can be achieved with somewhat fewer technical challenges.

The embodiments described above provide a number of significant advantages. This invention provides both the coarse and fine resolution necessary for communication in the Ku band using a single synthesizer in the IDU. Because both fine and coarse resolution is done in the IDU, the signal from the IDU is of a bandwidth such that a relatively inexpensive cable can be used between the IDU and the ODU and the ODU does not have to be enclosed with an expensive environmental housing to protect a synthesizer housed in the ODU. Furthermore, the invention balances the low phase noise, fine resolution, and low spurious level of the DDS such that Ku band transmission is achieved using a single synthesizer.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of the invention.

What is claimed is:

1. A frequency source generator for generating a carrier frequency for an externally applied transmission signal, comprising:
    an indoor unit having a direct digital synthesizer for establishing the carrier center frequency for data transmission, said indoor unit including a mixer and a reference source for producing an output signal having an intermediate frequency; and
    an outdoor unit for receiving said intermediate frequency signal from said indoor unit, said outdoor unit comprising a frequency multiplier for multiplying the frequency of said intermediate frequency signal upwards to a specified frequency band;
    wherein said indoor unit and said outdoor unit are physically separated and connected by a narrow bandwidth communication cable.

2. The frequency source generator of claim 1, wherein said outdoor unit multiplies the intermediate frequency signal from said indoor unit upwards to the Ku band.

3. The frequency source generator of claim 1, wherein said indoor unit comprises:
    a frequency oscillator for generating a reference frequency; and
    a mixer for producing said intermediate frequency signal, said mixer having as its inputs said reference frequency and an output frequency from said direct digital synthesizer.

4. The frequency source generator of claim 3, wherein said frequency multiplier comprises a PLL frequency synthesizer.

5. The frequency source generator of claim 3, wherein said outdoor unit further comprises:
    a narrow band tracking filter for removing transmission effects from said intermediate frequency signal.

6. The frequency source generator of claim 1 wherein said externally applied transmission signal is input to said outdoor unit.

7. The frequency source generator of claim 1 wherein said externally applied transmission signal is input to said indoor unit.

8. A method of performing wireless communication in a specified frequency range comprising the steps of:
    inputting transmission data into a first transmission unit;
    establishing a center carrier frequency signal for transmission using a direct digital synthesizer;

modulating said transmission data to an assigned communication channel such that it corresponds to said center carrier frequency signal;

generating a reference frequency signal;

mixing said center carrier frequency signal and said reference frequency signal to generate an intermediate frequency signal;

transmitting said intermediate frequency signal via a narrow bandwidth communication cable to a separate transmission unit; and multiplying the frequency of said intermediate frequency signal upwards to a specified carrier frequency for wireless communication.

9. The method of claim 8 wherein said specified carrier frequency is a Ku band frequency.

10. The method of claim 8, further comprising the step of removing transmission noise from said intermediate frequency prior to multiplying it upwards to said specified carrier frequency.

11. The method of claim 8 wherein said transmission data is modulated to said assigned communication channel in said direct digital synthesizer.

12. The method of claim 8 wherein said transmission data is modulated to said assigned communication channel in said separate transmission unit.

13. A frequency source generator for generating a carrier frequency for an externally applied transmission signal, comprising:

an indoor unit including a direct digital synthesizer for placing said externally applied transmission data in an assigned communication channel; a reference oscillator for generating a reference frequency signal; a mixer for combining the output of the direct digital synthesizer and the reference frequency signal to generate an intermediate frequency signal; and, a divider having as its input the reference frequency signal and having its output input to the direct digital synthesizer;

an outdoor unit for receiving the intermediate frequency signal generated by the mixer of the indoor unit, the outdoor unit being physically separated from the indoor unit and including a narrow band tracking filter for removing transmission noise from the intermediate frequency signal transmitted from the indoor unit and a frequency multiplier for converting the frequency of the output of the narrow band tracking filter to a specified carrier frequency band; and a narrow bandwidth communication cable connecting the indoor unit to the outdoor unit.

14. The frequency source generator of claim 13, wherein said conversion in the outdoor unit is to a Ku band frequency.

* * * * *